(12) United States Patent
Schroeder et al.

(10) Patent No.: US 6,807,334 B2
(45) Date of Patent: Oct. 19, 2004

(54) OPTICAL SWITCHING SYSTEM, OPTICAL SWITCH, AND ELECTRO-OPTICAL MECHANICAL DEVICE

(75) Inventors: Dale W. Schroeder, Scotts Valley, CA (US); Jonathan P.R. Lacey, Menlo Park, CA (US); Julie E Fouquet, Portola Valley, CA (US); Brian E. Lemoff, Union City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 67 days.

(21) Appl. No.: 10/214,287

(22) Filed: Aug. 6, 2002

(65) Prior Publication Data

US 2004/0028320 A1 Feb. 12, 2004

(51) Int. Cl.[7] .............................. G02B 6/35; G02B 6/42; G02B 26/08
(52) U.S. Cl. ............................... 385/18; 385/16; 385/15
(58) Field of Search ............................. 385/18, 16, 15, 385/92; 359/230, 223

(56) References Cited

U.S. PATENT DOCUMENTS

| | | | |
|---|---|---|---|
| 5,914,801 A | 6/1999 | Dhuler et al. | |
| 5,998,906 A | 12/1999 | Jerman et al. | |
| 6,087,747 A | 7/2000 | Dhuler et al. | |
| 6,134,042 A | 10/2000 | Dhuler et al. | |
| 6,185,107 B1 | 2/2001 | Wen | |
| 6,563,975 B2 * | 5/2003 | Towery | 385/18 |
| 6,707,959 B2 * | 3/2004 | Ducellier et al. | 385/17 |
| 2002/0034355 A1 * | 3/2002 | Hagelin et al. | 385/17 |
| 2002/0034356 A1 * | 3/2002 | Tew | 385/18 |
| 2002/0076138 A1 * | 6/2002 | Tew | 385/18 |
| 2002/0154851 A1 * | 10/2002 | Yeh et al. | 385/16 |
| 2003/0133646 A1 * | 7/2003 | Reznichenko | 385/18 |

* cited by examiner

Primary Examiner—Edward J. Glick
Assistant Examiner—Krystyna Suchecki

(57) ABSTRACT

An optical switching system includes a substrate, a microelectromechanical system (MEMS) input mirror, a MEMS output mirror, and an opposing mirror. The substrate is configured to carry an input light source and an output light source spaced from the input light source. The microelectromechanical system (MEMS) input mirror is carried by the substrate. The MEMS output mirror is carried by the substrate and is spaced from the MEMS input mirror. The opposing mirror is disposed opposite the substrate and is configured to communicate optically with an input light source and an output light source carried by the substrate. The input mirror optically couples an input beam from the input light source via the opposing mirror to a location on the opposing mirror with the output mirror via the opposing mirror. The output mirror optically couples the location on the opposing mirror with the output light source via the opposing mirror. In one case, the input light source and the output light source each comprise an optical fiber. An optical switch and an electromechanical device are also provided.

19 Claims, 2 Drawing Sheets

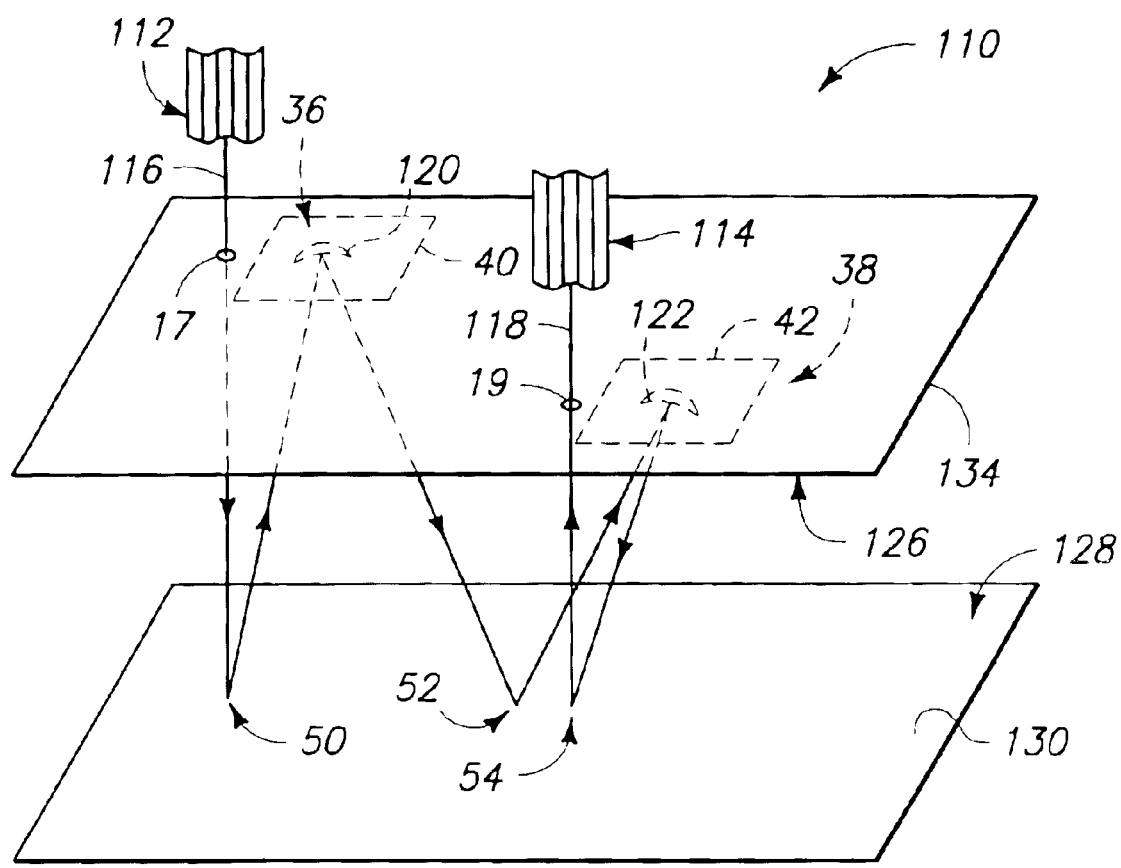

OPTICAL SWITCHING SYSTEM, OPTICAL SWITCH, AND ELECTRO-OPTICAL MECHANICAL DEVICE

TECHNICAL FIELD

The present invention pertains to optical switching systems. More particularly, the present invention relates to microelectromechanical system (MEMS) optical switches.

BACKGROUND OF THE INVENTION

Recent advances in the field of communications have led to the adoption of optical communications and light transmission. Light-based signals are transmitted over optical fibers in a manner that is similar to the manner in which electronic signals are transmitted over conductive lines on a semiconductor device. Recently, miniature optical switches have been developed to alter light paths between optical fibers, similar to the function that transistors perform for electronic signaling.

One form of optical switch utilizes micro-machined mirrors, or microelectromechanical system (MEMS) mirrors. Arrays of optical switches are used to rapidly reconfigure optical networks by altering one or more light paths in a system of intersecting optical fibers. Numerous other switch applications have been identified in optical communications systems. Accordingly, numerous unique optical switch arrays are presently known.

One form of optical switch comprises a three-dimensional MEMS switch that can be independently rotated about two different axes. U.S. Pat. No. 6,087,747, herein incorporated by reference, discloses one such construction for rotating a mirror in three dimensions about two sets of torsion beams using electrostatic actuators.

According to FIG. 1, a prior art three-dimensional MEMS optical switch 10 is shown having five different mechanical planes. Switch 10 comprises an array (or bundle) 12 of input fibers 16 and an array 14 of output fibers 18. Switch 10 also includes a microelectromechanical system (MEMS) input mirror 20 and a MEMS output mirror 22.

A light beam 24 is generated from input fiber 16 which is supported, or carried, by an input fiber substrate 26. Light beam 24 is then reflected by input mirror 20 onto a fixed mirror 30. Input mirror 20 is carried on an input mirror substrate 28. Reflected light beam 24 is further reflected by output mirror 22 on an output mirror substrate 32 for optical alignment with output fiber 18. Output fiber 18 is carried by an output fiber substrate 34.

Substrate 26 forms a first mechanical plane. Substrate 28 forms a second, independent mechanical plane. Fixed mirror 30 forms a third, independent mechanical plane. Substrate 32 forms a fourth, independent mechanical plane. Finally, substrate 34 forms a fifth, independent mechanical plane.

One problem associated with such prior art switch 10 results from difficulties encountered because of the five different mechanical planes. Such multiple planes cause assembly (or fabrication), alignment and mechanical drift problems. Furthermore, a typical construction for switch 10 is usually limited to N inputs and N outputs.

Accordingly, improvements are needed in the design and construction of such optical switches.

SUMMARY OF THE INVENTION

A three-dimensional MEMS optical switch provides one or more input mirrors and one or more output mirrors on a single, common substrate. Additionally, at least one input light source and at least one output light source are carried by the substrate. A fixed mirror is provided opposite the substrate. Both the input mirror and the output mirror are movable to impart alignment when transferring a light beam from an input light source to an output light source. In one case, the input mirror and the output mirror are rotatably actuatable about two perpendicular axes, as a gimbal, so as to direct an optical beam in three-dimensional space in order to project the optical beam onto a desired, selected spot on an opposing substrate in a two-dimensional plane. Preferably, the input mirrors and the output mirrors are dedicated to respective input fibers and output fibers, respectively.

According to one aspect, an optical switching system includes a substrate, a microelectromechanical system (MEMS) input mirror, a MEMS output mirror, and an opposing mirror. The substrate is configured to carry an input light source and an output light source spaced from the input light source. The microelectromechanical system (MEMS) input mirror is carried by the substrate. The MEMS output mirror is carried by the substrate and is spaced from the MEMS input mirror. The opposing mirror is disposed opposite the substrate and is configured to communicate optically with an input light source and an output light source carried by the substrate. The input mirror optically couples an input beam from the input light source via the opposing mirror to a location on the opposing mirror with the output mirror via the opposing mirror. The output mirror optically couples the location on the opposing mirror with the output light source via the opposing mirror.

According to another aspect, an optical switch includes a support structure, an input fiber, an output fiber, a stationary mirror, an input mirror, and an output mirror. The input fiber is carried by the support structure. The output fiber is carried by the support structure and is spaced from the input fiber. The stationary mirror is provided opposite the input fiber and the output fiber, and is tilted relative to respective optical paths for each of the input fiber and the output fiber. The input mirror is provided on the support structure optically aligned with an optical path reflected off the stationary mirror from the input fiber. The output mirror is angularly movable relative to the stationary mirror. The input mirror is angularly movable relative to the stationary mirror to optically align the reflected optical path from the stationary mirror so as to reflect off the stationary mirror and optically align with the output mirror. The output mirror is angularly movable relative to the stationary mirror to optically align the reflected optical path from the stationary mirror so as to reflect off the stationary mirror and optically align with the output fiber.

According to yet another aspect, an electro-optical mechanical device includes a support structure, an array of input fibers, an array of output fibers, at least one optical reflector, an array of rotatable input mirrors, and an array of rotatable output mirrors. The array of input fibers is carried by the support structure. The array of output fibers is carried by the support structure spaced from the array of input fibers. The at least one optical reflector is carried opposite the array of input fibers and the array of output fibers. The array of rotatable input mirrors is carried by the support structure. A selected input mirror is actuatable in optical alignment through the optical reflector with a selected input fiber. The array of rotatable output mirrors is carried by the support structure, wherein the selected input mirror is rotatably actuated to align an optical beam from the selected input fiber with a selected output mirror. The selected output mirror is rotatably actuated to align the optical beam with a selected output fiber.

Some embodiments of the present invention provide for a structure that can be built or assembled onto a single, common support surface in combination with an opposed mirror. Hence, an advantage is provided in that MEMS components and light inputs and light outputs can be fit onto one mechanical plane which is cheaper and easier to assemble and align than the multiple mechanical planes of the prior art technique of FIG. 1.

BRIEF DESCRIPTION OF THE DRAWINGS

Preferred embodiments of the invention are described below with reference to the following accompanying drawings depicting examples embodying the best mode for practicing the invention.

FIG. 3 is a simplified and schematic perspective view of the optical switch of FIG. 2 and showing a three-dimensional implementation.

DETAILED DESCRIPTION OF THE INVENTION

Figure 2:
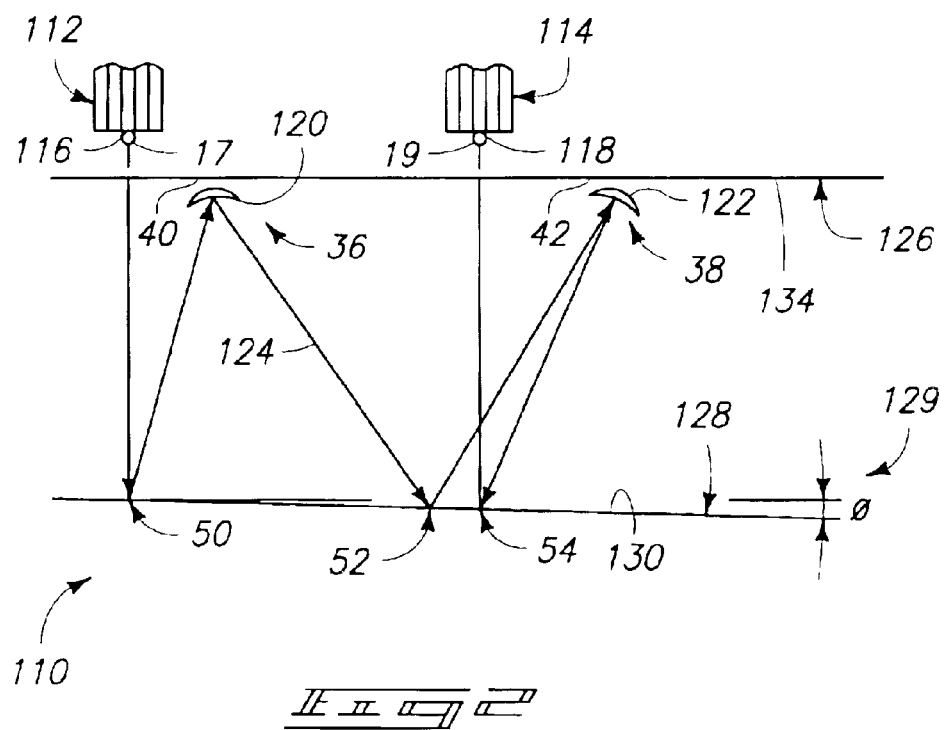
FIG. 2 is a simplified schematic view illustrating a microelectromechanical system (MEMS) optical switch suitable for two-dimensional and three-dimensional applications according to one aspect of the invention.

FIG. 2 illustrates a three-dimensional MEMS optical switch identified by reference numeral 110 according to one embodiment of the present invention. Switch 110 comprises an array 112 of input fibers 116 and an array 114 of output fibers 118. In one case, arrays 112 and 114 each comprise a bundle of fibers 116 and 118, respectively. Furthermore, arrays 112 and 114 can either be regular arrays or irregular arrays. Switch 110 also includes an opposing mirror 130, a microelectromechanical system (MEMS) input mirror 120, and a MEMS output mirror 122. Opposing mirror 130 is configured to provide an optical reflector. In one case, opposing mirror 130 is a fixed, opposing mirror.

According to a first construction, opposing mirror 130 comprises a flat mirror that is tilted at an inclination angle (φ), reference numeral 129, relative to a plane of input substrate 126 that supports mirrors 120 and 122. More particularly, fixed mirror 130 is tilted such that respective optical paths for each input fiber 116 and output fiber 118 are not perpendicular to opposing mirror 130. In this manner, light from optical paths for the input fibers and the output fibers reflect at a non-normal angle relative to opposing mirror 130 so that light doesn't travel back onto itself. According to alternative constructions, opposing mirror 130 comprises a curved surface mirror such as a concave mirror or a convex mirror. With such alternative constructions, the fixed mirror does not necessarily form an inclination angle (φ) relative to a plane of input substrate 126. Relative to FIGS. 2 and 3, angles between reflective surfaces and optical paths have been exaggerated in order to render aspects of the construction more clearly in the drawings.

Each input fiber 116 is configured relative to input mirror 120, opposing mirror 130, and output mirror 122 to deliver a light beam 124 to a corresponding output fiber 118. Hence, light beam 124 comprises an optical signal that is delivered from input fiber 116 to output fiber 118.

According to one construction, input mirror 120 is dedicated to a respective input fiber 116. Likewise, output mirror 122 is dedicated to a respective output fiber 118. In operation, mirror 120 is oriented to select a desired output mirror 122 that is dedicated to a desired output fiber 118 in order to optically communicate with a desired optical output path. Likewise, output mirror 122 can be aligned to select another input mirror 120 dedicated to a respective, desired input fiber 116.

Input mirror 120 comprises a rotatably movable three-dimensional microelectromechanical system (MEMS) mirror. Construction of one such mirror is disclosed in U.S. Pat. No. 6,087,747, previously incorporated by reference. Other constructions are disclosed in U.S. Pat. Nos. 5,914,801 and 6,134,042, incorporated herein by reference. In one case, mirrors 120 and 122 are concave to provide focusing of beams reflected therefrom. In another case, mirrors 120 and 122 are flat.

In operation, a selected input mirror 120 is rotated about two perpendicular axes, like a gimbal, so as to orient the selected input mirror such that a normal vector from the mirror is oriented in three-dimensional space so as to target a desire one of the output mirrors 122.

Input mirror 120 and output mirror 122 each utilize an actuator, such as an electrostatic microactuator, by moving the mirror along two axes to impart three-dimensional positioning of such mirror. U.S. Pat. No. 5,998,906 discloses one construction for an electrostatic microactuator usable with a three-dimensional MEMS mirror. Such U.S. Pat. No. 5,998,906 is herein incorporated by reference. Alternatively, a piezoelectric microactuator can also be utilized. Further alternatively, any device usable to rotatably articulate or actuate a three-dimensional MEMS mirror can also be utilized.

During transmission of information through switch 110, a light beam 124 is emitted from input fiber 116 of fiber bundle 112 by way of a focusing lens 17. Light beam 124 is reflected off a location 50 on opposing mirror 130 and onto an input mirror 120. Light beam 124 is then reflected by input mirror 120 onto a stationary, or fixed mirror 130. Mirror 130 then reflects light beam 124 onto output mirror 122 for optical alignment with output fiber 118. Aligned light beam 124 is then further focused as it enters output fiber 118 by way of a focusing lens 19.

Input mirror 120 is positioned relative to fiber 116 and opposing mirror 130 so that light is reflected to a location 52 on opposing mirror 130, when properly rotatably positioned, to cause light beam 124 to strike output mirror 122. Output mirror 122 is further aimed, or rotatably positioned, at location 54 on opposing mirror 130 in order to cause light beam 124 to strike output fiber 118 at an aligned, proper angle so as to couple light beam 124 into fiber 118. Output mirror 122 is of similar construction to input mirror 120.

According to one construction as depicted in FIGS. 2 and 3, input mirror 120 is one of a plurality of input mirrors provided within an array 36. Array 36 includes one or more tiles, such as tile 40. In one case, array 36 is provided by a single tile 40. In another case, array 36 is provided by a plurality of tiles 40. Similarly, output mirror 122 is one of a plurality of output mirrors provided within an array 38 comprising one or more tiles, such as tile 42.

The use of tiles is provided as a manufacturing convenience, wherein tile sub-arrays are fabricated to help address manufacturing yield and mechanical stability considerations. U.S. Pat. No. 6,185,107 describes one technique for fabricating tile sub-arrays using MEMS techniques. Such U.S. Pat. No. 6,185,107 is incorporated herein by reference. According to such techniques, a tile can be constructed having a plurality of MEMS mirrors, after which a group of tiles is joined together on a substrate in a tile-to-tile arrangement to form an array. One technique entails the use of solder bumps placed on the bottom of each tile, with corresponding contact pads being provided on the substrate.

According to such one construction, the number of input mirrors and output mirrors is the same as the number of input fibers and output fibers, respectively. Hence, there is a one-to-one correspondence of input fibers and input mirrors, as well as a one-to-one correspondence of output fibers and output mirrors. Each input mirror and output mirror is movable in three dimensions such that any one input fiber can communicate with any one output fiber, and vice versa. Preferably, a plurality of input fibers emit light towards each tile corresponding to an array N×N, such as a 5×5 array of three-dimensional MEMS mirrors. Alternatively, an array can comprise 1×N mirrors, or even a single mirror.

Figure 1:
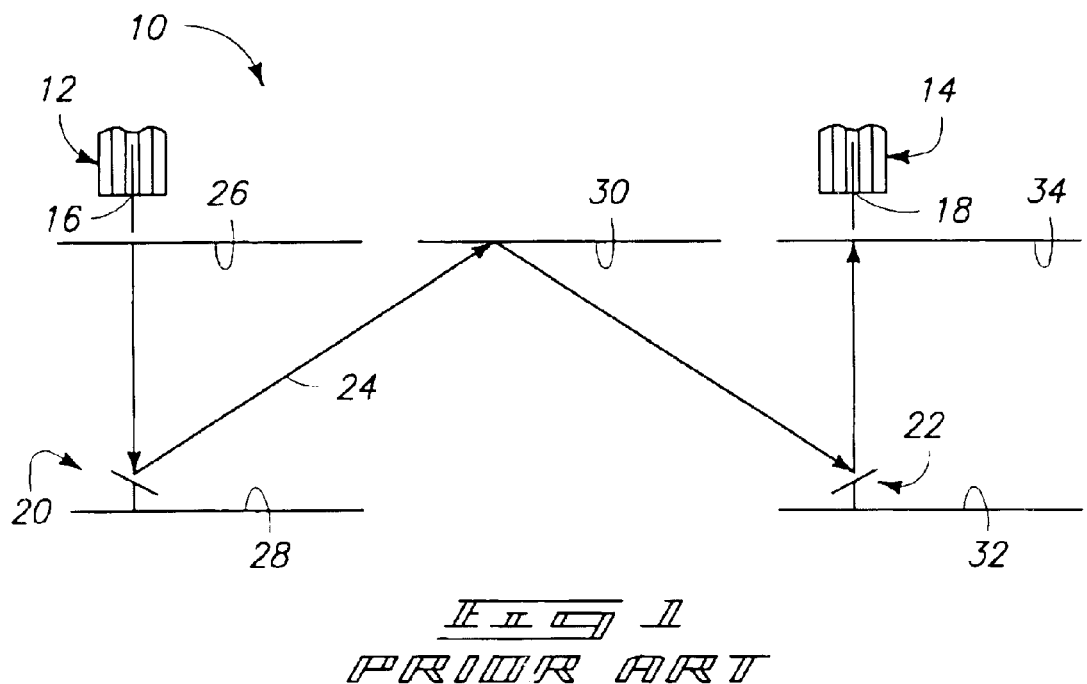
FIG. 1 is a simplified schematic view illustrating a prior art three-dimensional microelectromechanical system (MEMS) optical switch.

Accordingly, fixed mirror 130 is provided on a fixed mirror substrate 128 that forms a first substrate, and fiber/movable mirror substrate 126 forms a second substrate comprising a monolithic silicon substrate 134. Monolithic silicon substrate 134 provides a support structure. In one case, fixed mirror 130 is formed integrally from substrate 128. In another case, fixed mirror 130 is bonded onto substrate 128. The use of only two opposed substrates in constructing switch 110 simplifies alignment, and reduces thermal and mechanical drift, in contrast with the prior art technique discussed with reference to FIG. 1 which used five substrates.

In contrast with prior art techniques, optical switch 110 includes a single, common substrate (or plane) 126 onto which fiber bundles 112 and 114 are affixed, and from which mirrors 120 and 122 are microelectromechanically machined. Alternatively, mirrors 120 and 122 are affixed and aligned as separate assemblies that are subsequently affixed onto a common substrate. In one case, each mirror is provided on a dedicated tile. In another case, each mirror is provided on a dedicated secondary substrate that is affixed to a primary, common substrate. Accordingly, optical switch 110 only requires the addition of one fixed mirror 130 disposed opposite substrate 126. Alternatively, a plurality of fixed mirrors 130 can be disposed opposite substrate 126. According to one construction, substrate 126 comprises a monolithic silicon device 134.

Accordingly, a three-dimensional MEMS switch incorporates all input and output fibers and input and output mirrors on a single, common carrier provided by substrate 134. Substrate 134 provides a single plane containing one or more tiles, each comprising an array of movable two-axes concave MEMS mirrors. Such a two-axes MEMS mirror includes two perpendicular torsional hinges that enable positioning of the mirror in three dimensions. A similar array of optical fibers 116, 118 is provided by input bundle 112 and output bundle 114, respectively. Light from input fiber 116 reflects off fixed mirror 130 and strikes a single one of three-dimensionally movable input mirrors 120. The angle of input mirror 120 is adjusted by rotating mirror 120 so that the light beam 124 is reflected to location 52 such that light beam 124 strikes MEMS output mirror 122. Output mirror 122 is aimed at location 54 on fixed mirror 130 which causes light beam 124 to strike output fiber 118 via lens 19 at a proper angle so as to couple light beam 124 into fiber 118.

As shown in FIG. 3, substrate 134 comprises a single plane containing one or more tiles 40 and 42. Each tile 40 and 42 comprises a sub-array of an overall array 36 and 38, respectively, of two-axes, three-dimensional movable concave MEMS mirrors. Furthermore, substrate 134 comprises a corresponding, similar array 112 and 114 of optical fibers. In one case, each array of fibers forms a bundle of fibers.

As shown in FIG. 3, a single input mirror 120 is depicted within tile 40 and a single output mirror 122 is depicted within tile 42. However, it is understood that a plurality of such input mirrors 120 and output mirrors 122 are provided within tiles 40 and 42. For example, an N×N array of input mirrors 120 is provided within tile 40 and an N×N array of output mirrors 122 is provided within tile 42.

Many prior art constructions for a common three-dimensional MEMS switch are limited to an N×N array of fibers. In contrast, according to one construction of the present invention, a single-sided MEMS switch can have any configuration of mirrors within an array of fibers in order to achieve anywhere in the range of 1 input and 2n−1 outputs up to 2n−1 inputs and 1 output. In this case, n is the total number of mirrors including mirrors for input fibers and output fibers. By way of example, one such array comprises a 5×5 array of input mirrors 120 within tile 40 and a 5×5 array of output mirrors 122 within tile 42. For the case where array 36 comprises a single tile 40, array 36 comprises a 5×5 array of input mirrors 120. Similarly, for such case, there exists a single tile 42 that provides a 5×5 array 38 of output mirrors 122. In such exemplary case, bundle 112 comprises an array of twenty-five input fibers 116. Similarly, bundle 114 comprises an array of twenty-five output fibers 118. Hence, n equals 50.

Accordingly, substrate 134 comprises a monolithic silicon substrate according to one construction so as to provide a single-sided MEMS switch 110. According to one construction, bundles 112 and 114 are chemically bonded within respective apertures machined within the monolithic silicon substrate utilizing an adhesive. Suitable adhesives include epoxies such as a two-part epoxy, a Group B epoxy (such as a heat reactive epoxy), and a preform epoxy. Other suitable adhesives include polymethylmethacrylate and any adhesive or bonding material presently known in the art for affixing optical fiber or bundles of optical fiber to a substrate, such as a monolithic silicon substrate. Such adhesive fixation is intended to rigidly bond input fibers and output fibers to the silicon substrate. One technique for providing an aperture is to micro-machine an aperture into the silicon substrate. Accordingly, an array of input fibers and an array of output fibers can be adhesively bonded into micro-machined apertures within a silicon substrate.

For the case where array 36 comprises more than one tile 40 of input mirrors 120 and array 38 comprises more than one tile 42 of output mirrors 122, each comprises a tiled array 36 and 38 of input mirrors 120 and output mirrors 122, respectively.

In compliance with the statute, the invention has been described in language that delineates structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims.

What is claimed is:

1. An optical switching system, comprising:
   a substrate configured to carry an input light source and an output light source spaced from the input light source;
   a microelectromechanical system (MEMS) input mirror canted by the substrate;
   a MEMS output mirror canted by the substrate and spaced from the MEMS input mirror; and an opposing planar mirror disposed opposite the substrate and tilted at an inclination angle to communicate optically with an input light source and an output light source carried by the substrate;

wherein the input mirror optically couples an input beam from the input light source via the opposing mirror to a location on the opposing mirror with the output mirror via the opposing mirror, and wherein the output mirror optically couples the location on the opposing mirror with the output light source via the opposing mirror.

2. The optical switching system of claim 1 wherein the input light source includes an interface to at least one optical fiber and the output light source includes an interface to at least one optical fiber.

3. The optical switching system of claim 1 wherein the substrate comprises a monolithic silicon substrate.

4. The optical switching system of claim 3 wherein the input light source comprises an input fiber and the output light source comprises an output fiber, and wherein the input fiber and the output fiber are bonded to the silicon substrate.

5. The optical switching system of claim 3 wherein the input mirror and the output mirror are micro-machined in the silicon substrate.

6. The optical switching system of claim 1 wherein the input light source comprises an input fiber and the output light source comprises an output fiber, and wherein the substrate carries an array of input fibers and an array of output fibers.

7. The optical switching system of claim 6 wherein the substrate carries a tiled array of independently controllable input mirrors and a tiled array of independently controllable output mirrors.

8. An optical switch, comprising:

a support structure;

an input fiber carried by the support structure;

an output fiber carried by the support structure and spaced from the input fiber;

a tilted stationary planar mirror opposite the input fiber and the output fiber;

an input mirror provided on the support structure optically aligned with an optical path reflected off the stationary mirror from the input fiber; and an output mirror angularly movable relative to the stationary mirror;

wherein the input mirror is angularly movable relative to the stationary mirror to optically align the reflected optical path from the stationary mirror so as to reflect off the stationary mirror and optically align with the output mirror; and wherein the output mirror is angularly movable relative to the stationary mirror to optically align the reflected optical path from the stationary mirror so as to reflect off the stationary mirror and optically align with the output fiber.

9. The optical switch of claim 8 wherein the support structure includes a planar support substrate and the stationary mirror is tilted relative to the support substrate.

10. The optical switch of claim 9 wherein the output fiber is one of a plurality of output fibers arrayed at unique locations on the support structure, and wherein the output mirror is actuatable to selectively align a light beam from the input fiber with one of the output fibers.

11. The optical switch of claim 9 wherein the input fiber is one of a plurality of input fibers arrayed at unique locations on the support structure, and wherein the input mirror is actuatable to selectively align a light beam from a selected one of the input fibers with the output fiber.

12. The optical switch of claim 9 wherein the support structure comprises a monolithic semiconductor structure.

13. The optical switch of claim 8 wherein the input fiber is one of a plurality of bundled input fibers and the output fiber is one of a plurality of bundled output fibers.

14. The optical switch of claim 13 wherein the input mirror comprises a tiled array of two-axes movable MEMS mirrors and the output mirror comprises a tiled array of two-axes movable MEMS mirrors.

15. The optical switch of claim 14 wherein the stationary mirror is tilted relative to respective optical paths for each of the input fiber and the output fiber.

16. An electro-optical mechanical device, comprising:

a support structure;

an array of input fibers carried by the support structure;

an array of output fibers carried by the support structure spaced from the array of input fibers;

at least one titled planar optical reflector opposite the array of input fibers and the array of output fibers;

an array of alignable input mirrors carried by the support structure, a selected one of the input minors in optical alignment through the optical reflector with a respective one of the input fibers;

an array of alignable output mirrors carried by the support structure, the selected input mirror actuatable to align an optical beam from the selected input fiber with a selected output mirror, and the selected output mirror actuatable to align the optical beam with a selected output fiber;

wherein the input mirrors are optically aligned by rotation via the optical reflector with a respective output mirror for a selected one of the output fibers.

17. The electro-optical mechanical device of claim 16 wherein a beam of light transmitted by the selected input fiber is reflected by the optical reflector to the selected input mirror, wherein the selected input mirror further reflects the beam of light to a spot on the optical reflector that causes the beam of light to be further reflected to the selected output mirror, and wherein the selected output mirror causes the beam of light to be further reflected by the optical reflector to couple the beam of light into the selected output fiber.

18. The electro-optical mechanical device of claim 17 wherein the selected input mirror is rotatable about two axes so as to orient the selected input mirror three-dimensionally to target a desired one of the output mirrors.

19. The electro-optical mechanical device of claim 18 wherein the desired one of the output mirrors is rotatable about two axes so as to orient a reflected beam of light from the input mirror with a respective output fiber.

* * * * *